F. A. BRUCKMAN.
TRIMMING AND DELIVERING MECHANISM FOR PASTRY MAKING MACHINES.
APPLICATION FILED APR. 16, 1917.
1,271,844.
Patented July 9, 1918.
4 SHEETS—SHEET 1.
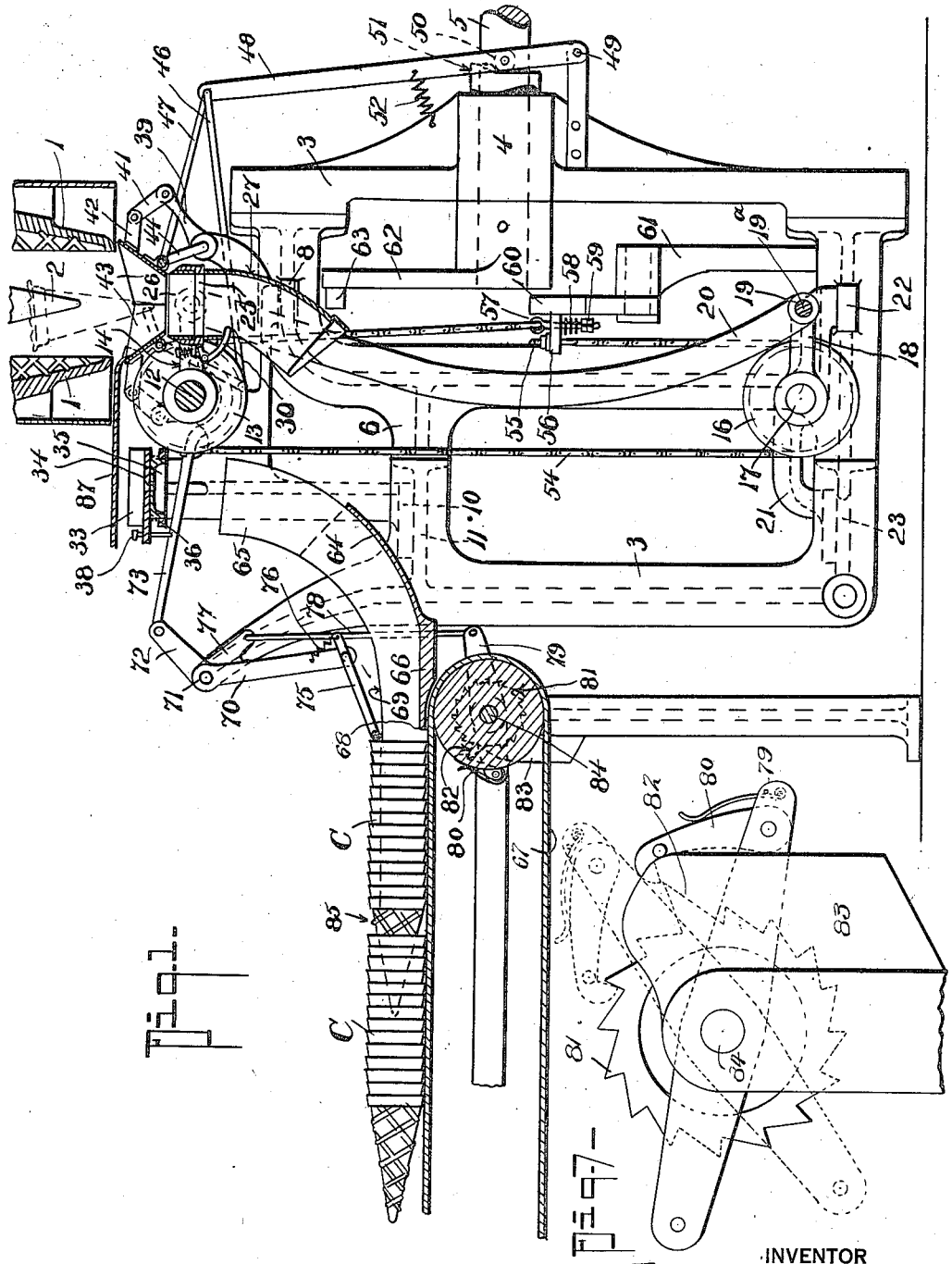
INVENTOR
F. A. Bruckman
BY
Fred G. Dieterich
ATTORNEYS

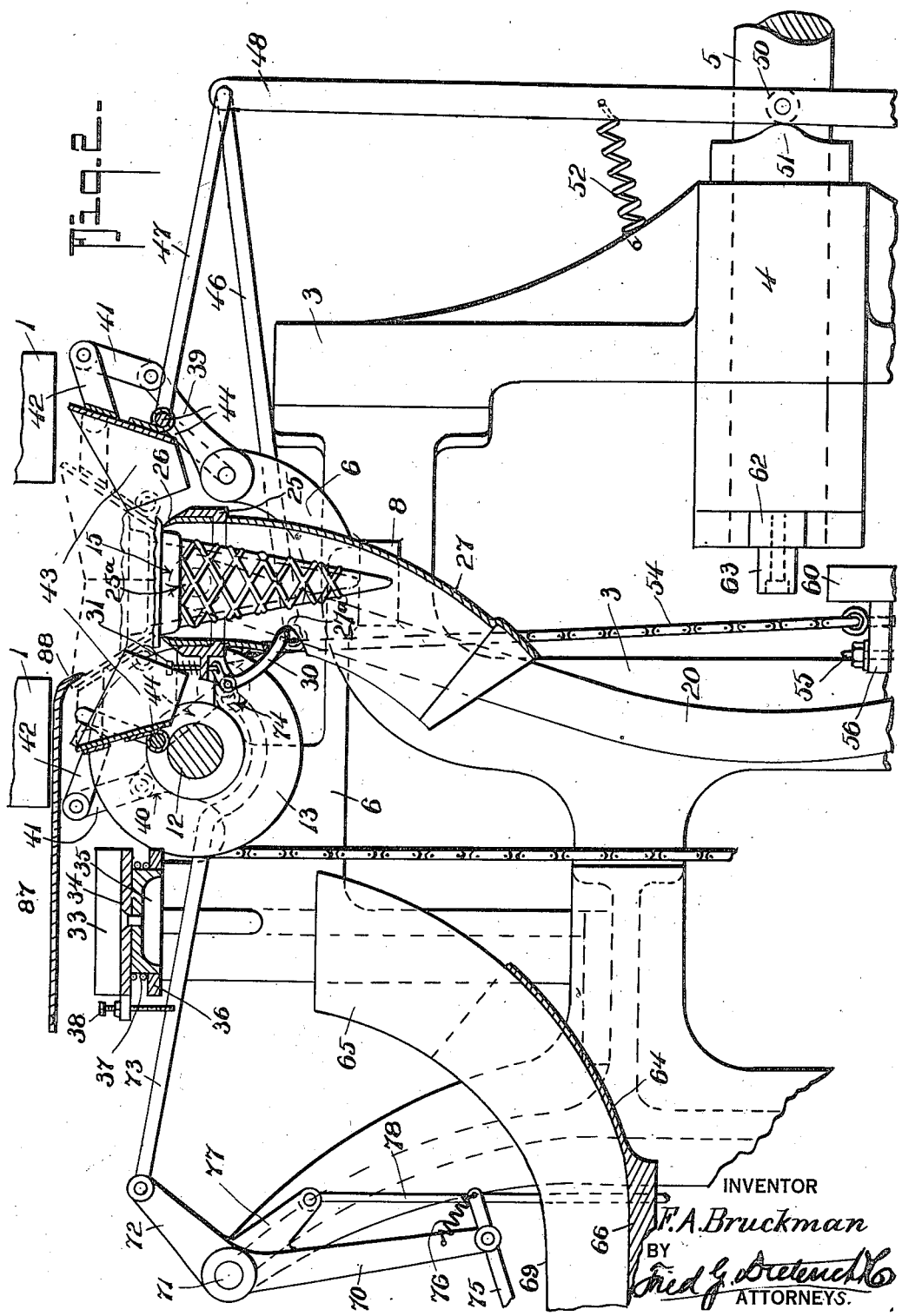

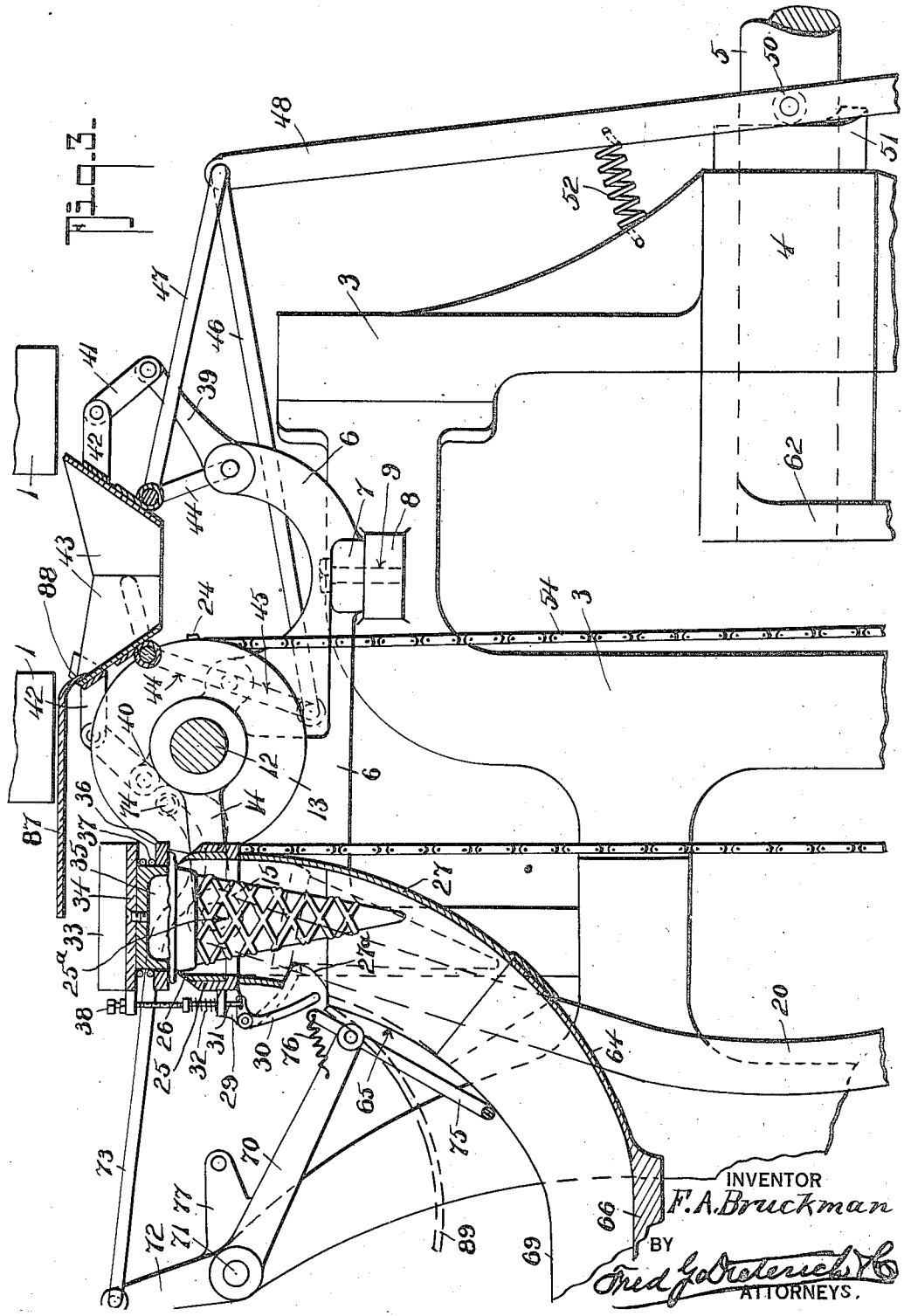

F. A. BRUCKMAN.
TRIMMING AND DELIVERING MECHANISM FOR PASTRY MAKING MACHINES.
APPLICATION FILED APR. 16, 1917.
1,271,844.
Patented July 9, 1918.
4 SHEETS—SHEET 4.
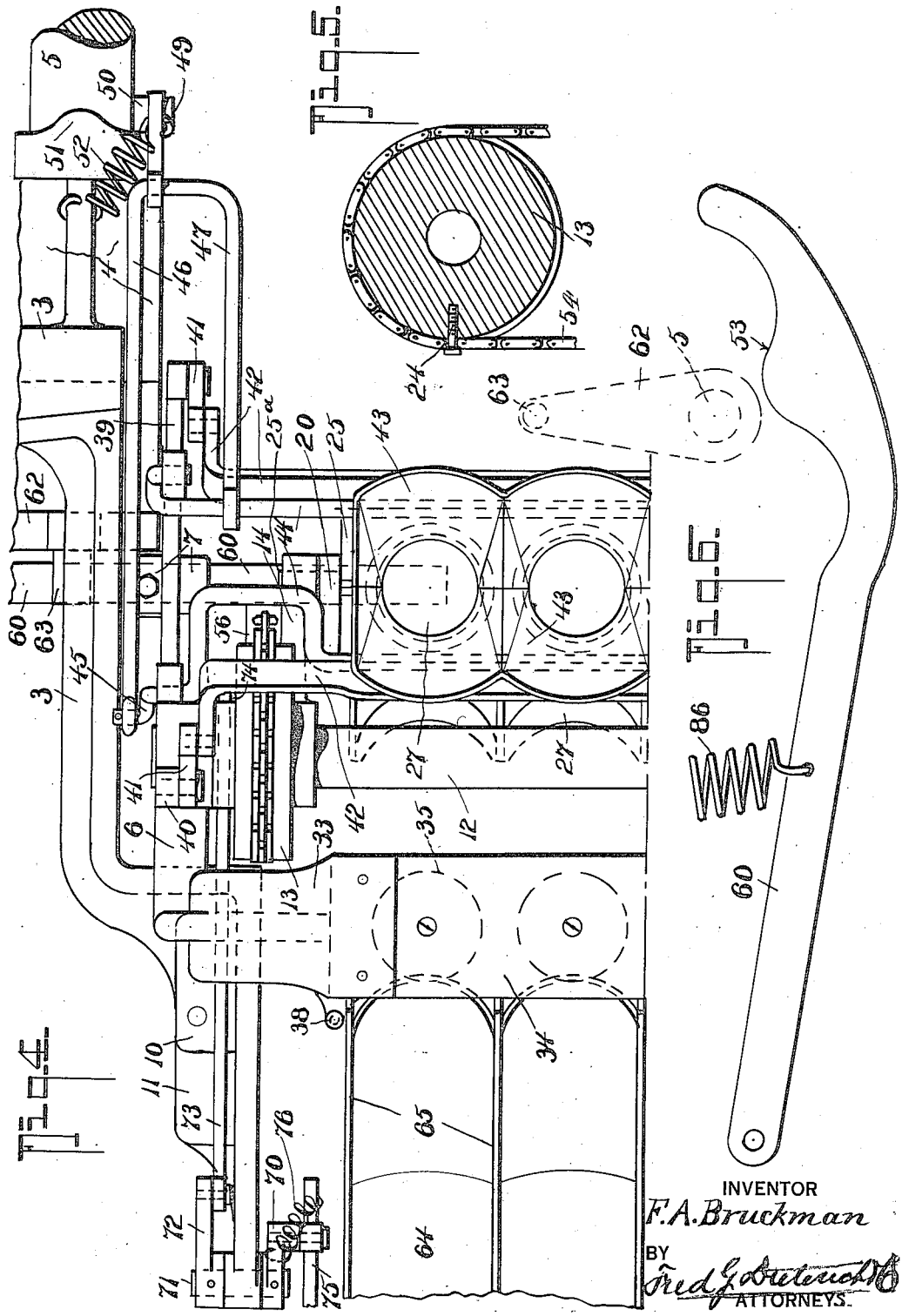
INVENTOR
F. A. Bruckman
BY
Fred G. Dieterich
ATTORNEYS.

UNITED STATES PATENT OFFICE.

FREDERICK A. BRUCKMAN, OF PORTLAND, OREGON.

TRIMMING AND DELIVERING MECHANISM FOR PASTRY-MAKING MACHINES.

1,271,844.  Specification of Letters Patent.  Patented July 9, 1918.

Application filed April 16, 1917. Serial No. 162,428.

*To all whom it may concern:*

Be it known that I, FREDERICK A. BRUCKMAN, residing at Portland, in the county of Multnomah and State of Oregon, have invented certain new and useful Improvements in Trimming and Delivering Mechanism for Pastry-Making Machines, of which the following is a specification.

My invention relates to the art of cup pastry molding and baking machinery, and more especially to that type which is adapted for use in manufacturing ice cream cones, such machines, for instance, as are disclosed in my prior Patent No. 1,071,027, issued August 26, 1913. In the said patent, I have disclosed a complete machine embodying, generally, molding and baking devices, mechanism for supplying batter to the molding devices, mechanism for discharging or extracting the cones from the molding devices after the baking operation has been completed, a trimming mechanism for removing the excess batter or "heads" from the baked cones, and means for removing the finished product from the machine, the action of the aforementioned parts being automatic—*i. e.*, effected mechanically by the coöperation of the several parts without the intervention of an operator to coördinate the several parts of the machine. In practice, it has been found that occasionally, the cones hang up and do not properly chute into the trimmer tubes owing to the distance between the tubes and the molds and the necessity of employing a relatively long chute, and owing further to the fact that, when they are released from the molds, they do not always fall true, but sometimes turn and, in dropping the points tend to catch and are not properly introduced into the particular section of the chute employed, thus making it necessary for the attendant to fish out the cone or to redirect it, in its travel through the chute, with a wand or stick. It is therefore one of the principal objects of the present invention to overcome this objection and to render the action of the machine more truly and completely automatic, so that the services of the attendant may be dispensed with or he may be allowed to occupy his time in looking after a number of machines and making up boxes in which the cones are packed for shipment.

Another object of the invention is to so improve the delivering mechanism as to facilitate the operator in putting the cones into the boxes, the cones, in practice, are put into the boxes in "sticks," *i. e.*, a certain number of cones are nested together, (usually fourteen) and this nest of cones is long enough to fill one of the tubes or honey-combs of the box. Heretofore, it has been necessary for the operator to count off from the long or continuously nested "stick" of cones the required number, separate them by hand, and place them in the box. My present invention therefore has for its object to so handle the cones as they are discharged from the trimmer that they will be automatically sub-divided into "sticks," each "stick" containing the same predetermined number of cones and adjacent "sticks" being separated by an interval so that the operator need only glance at the continuously moving nested cones to determine the length of "stick," (number of cones) that will go into the box tube, thus making it unnecessary for him to count the cones or separate one part of a "stick" from another.

Again, it is the object of the present invention to provide for locating the trimming mechanism close up to the molds and reduce to the minimum the distance the cones will have to drop through the chute before going into the trimmer tubes. A further object of the invention is to provide a trimming mechanism in which the trimmer-pusher is stationary and the tubular knives are movable from the receiving station to the place where the pusher is located and are there brought into operative engagement with the pusher.

My invention has for a still further object to provide a means for holding any cones which pass from the molds without "heads" and which would therefore pass through the pusher tubes at the receiving station, until the trimmer tubes shall have been carried from the receiving station to the delivery station of the trimming mechanism, so that all of the cones of a set (*i. e.*, those discharged from a single mold unit) may be simultaneously discharged into the final exit or offtake chute and delivered onto the outgoing conveyer by the counting and nesting device.

Another object of the invention is to improve the initial or intake chute of the trimming mechanism, *i. e.*, the chute which guides the cones from the molds to the trimmer tubes whereby the cones will be absolutely prevented from tangling or hanging up in the machine and will be always guided in the proper trimmer tubes.

More subordinately the invention includes those novel details of construction, combination and arrangement of parts, all of which will be first fully described, then be specifically pointed out in the appended claims and illustrated in the accompanying drawings, in which:—

Figure 1 is a vertical longitudinal section showing the invention.

Fig. 2 is an enlarged detail vertical section showing the parts in the position they assume during the first step of action, i. e., the opening of the chute to deposit the cones that have been released from the molds into the trimmer tubes and clear the same.

Fig. 3 is a view similar to Fig. 2 with the parts in the position just prior to the final trimming.

Fig. 4 is a top plan view of the invention.

Fig. 5 is a detail section of one of the oscillating disks which carry the trimmer tubes and showing the means for fastening the operating chain thereto.

Fig. 6 is a detail side elevation of the operating lever showing its undulations to effect a uniform speed of oscillation of the trimmer tubes.

Fig. 7 is a detail view of the skip mechanism for spacing the cones into sticks.

In the drawings, in which like numerals and letters of reference indicate like parts in all of the figures, 1 represents the female sections of the molding devices and 2 the cores therefor. The molding devices 1 and 2 and the mechanism for operating the same may be of the present or well-known construction. 3 designates a part of the framing of the present machine, which has a bearing 4 for the shaft 5 (preferably, the first motion shaft).

6 designates supplemental brackets which are secured to lugs 8 on the frame 3 and are also secured at 10 to the web 11 of the frame 3, there being one of these brackets 6 at each side of the mechanism.

9 designates the bolts by which the brackets 6 are secured to the lugs 8 bolts 9 passing through the lugs 7 of the bracket 6.

Mounted in suitable bearings in the brackets 6 is a shaft 12, which carries a disk 13 at one side of the frame, and an arm 14 at both sides of the frame, the disk 13 being integrally formed with one of the arms 14. The arms 14 terminate in bearings 15 in which the trunnions 25ª of the trimming tube carrying bar 25 are journaled and the trimming tube carrying bar 25 is adapted to be oscillated through the action of the shaft 12, while being maintained with its own axis parallel to itself at all times. This is accomplished by a connecting rod 20 that is secured to the trunnions 25ª and to the bar 25 and projects downwardly and is provided with a bearing 19 that is connected to a cross rod 19ª which connects the outer bearings of bottom arms 18, which arms 18 are of the same construction as the arms 14 and to one of which a disk 16 of the same construction as the disk 13 is cast, the arms 18 being journaled on stops 17 held in brackets 21 that are secured to the lug 22 and web 23 of the frame 3 near the bottom. The disks 13 and 16 are peripherally grooved to receive an operating chain 54, hereinafter again referred to, the chain 54 being pinned at 24 to the disks 13 and 16.

25 designates the trimmer tube carrying frame which may be of the usual construction and may be provided with the usual trimmer knives 26. The member 25 carries a part 27 of the delivery chute, which chute part 27 is designed to match with the other part 64 when the parts are in the position shown in Fig. 3.

The chute section 27 is recessed at 27ª and the bar 25 is provided with a bracket 29 on which a bell crank finger 30 is pivoted, the finger 30 being designed to project into the recess 27ª (see full lines, Fig. 2, and dotted lines in Fig. 3) by the action of the spring 32 on the push pin 31, the push pin having connection with the short arm of the bell crank finger 30. The bracket 6 has a vertical portion 33 which sustains the pusher bar 34, the bar 34 being connected to the vertical portion 33 of the bracket at the ends of the bar and the pusher bar 34 may be of the ordinary construction.

The bar 34 as usually constructed on the machines built in keeping with my patent also includes members 35 that enter the knives 26 and plates 36 which yield against the tension of the spring 37 when the plunger members 35 enter the knives 26. The bar 34, in the present construction, supports an adjustable screw 38. The bracket 6 is provided with trunnions 39 and 40 to which the lugs 41 are pivoted. The lugs 41 are also pivoted to projections 42 on the intake chute sections 43. The intake chute, i. e., the chute located between the trimmer knives and the molding devices at the extraction station in the present form is in the nature of tubular members to form, as it were, a tubular or hopper-like chute for each trimmer section. The hopper-like chute members 43 are also connected to links 44 which are journaled in bearings in the bracket 6, one of the links 44 being extended at 45. 46—47 are the connecting rods which are connected respectively to the extension 45 of one of the links 44 and to the other link 44 the rods 46 and 47 being themselves connected to the lever 48 which is pivoted at 49 and is provided with a roller 50 to contact the cam 51 on the shaft 5 whereby the cam 51 will throw lever 48 from the position shown in Fig. 1 to the position shown in Fig. 2, to open the sections 43 of the chute, the lever 48 being restored to the chute closing position by a spring 52.

The chain 54 has one end secured to a bolt 55 that passes through a bracket 56 on the lever 60, while the other end is connected to a bolt 57 that passes through the bracket 56 and is held by a spring 58 and jam nuts 59 with spring tension to allow a slight yielding in the down thrust on the chain for buffer action.

The lever 60 is pivoted on a support 61 and is designed to be engaged by roller 63 on the operating crank 62 which is secured on the shaft 5, the lever 60 having a peculiarly designed undulated surface 53 so formed that when the roller 63 engages the lever, the speed of movement of the chain will not be sudden as compared with the intermediate portion of the movement stroke, but on the other hand, will be practically uniform throughout the entire period of motion. In other words, the crank 62, rotating in a clockwise direction in Fig. 6, will engage the lever 60 near the outer end and by reason of the convex curvature of the lever the downward stroke of the lever 60 will be at a substantially uniform speed, thus preventing a sudden jerking away of the trimmer tube in starting from the extracting station and also preventing a too sudden push upwardly against the trimmer plunger members at the completion of the down stroke of the lever 60 and on the return or up stroke of the lever 60 the movement will also be substantially uniform but at a somewhat greater speed than the downward motion.

The delivery mechanism, which insures the cones leaving the trimmer knives systematically and in order, comprises the stationary section 64 and the movable chute section 27, the latter being carried by the trimmer knife bar 25, as before described, and in order to divide or separate the cones that pass through the various tubular sections of the trimmer, I provide partition wings 65 that project up into the movable chute section to separate the adjacent cones and cause them to fall individually into the proper alinement with previously discharged cones.

67 designates an endless conveyer which is designed to receive the cones as they are moved off of the chute section 66 and convey the same out of the machine. This conveyer acts as the nesting conveyer, that is,—the conveyer on which the cones are nested into "sticks."

In order to nest the cones into "sticks", I locate the conveyer 67 slightly below the upper surface of the stationary part 66 of the section 64, so as to form a step 68 and adjacent to the said step the wings 65 are of lesser height, as at 69, so that a finger 75, which is carried by a bell crank 70—72, can rest on the partition 65 and engage the mouths of the cones to push one cone into the preceding cone. The bell crank lever 70—72 is pivoted at 71 to an extension of the frame 3 and is operated by a connecting rod 73 that is connected to the short arm 72 of the bell crank, at one end, and is connected at the other end as at 74 to the disk 13 so that as the trimmer tube is moved from the position shown in Fig. 2 to the position shown in Fig. 3, the bell crank 70 will be moved to raise the finger 75 (which is held in engagement with the partition 65 by the spring action 76) and the members 65 are made of greater depth near the top, than the diameter of the heads of the cones so that when the finger 75 is raised, as shown in Fig. 3, the cones will drop past the finger and gravitate down onto the stationary part of the chute 66, so that when the trimmer tubes are returned from the position shown in Fig. 3 to the position shown in Figs. 1 and 2, the finger 75 will be lowered and by engaging the mouth of the cone will push it into the preceding cone.

In order to separate a predetermined number of nested cones from an adjacent corresponding number so as to form "sticks" of predetermined lengths, I provide for imparting a step-by-step movement to the conveyer 67, one step for each cone until the required number of cones have been nested together and for a longer step to provide a separation between the adjacent "sticks" of cones C. This may be accomplished by providing the lever 70—72 with an arm 77 that is connected by connecting rod 78 with a rocking lever 79 that carries a pawl 80 which engages a ratchet 81 on the operating shaft 84 of the operating conveyer 67, the teeth of the ratchet 81 being spaced apart so that each tooth will move the conveyer the distance of one step or the length of one cone mouth. The ratchet 81 is also provided with a longer tooth 82 which is designed to be engaged by the pawl 80 to move the conveyer 67 a greater distance than one step (preferably two steps) so as to form the intervals 85 between adjacent cone "sticks" C (see Fig. 1). 83 is a throw-out cam that is designed to engage the pawl 80 after it has moved the conveyer 67 one step and throw the pawl out of the teeth of the ratchet 81, the long tooth 82, however, being so designed that the cam will not throw out pawl 80 until the conveyer has moved two steps to form the interval 85, as will be clear by reference to the drawings.

In operation, the cones are released from the molds at what is known as the "extraction station" and this is accomplished by loosening the cores in advance of the complete opening of the female mold sections so that the cores act as fingers to strip the cones loose from the mold sections, thus causing the cone to drop, as shown in dotted lines in Fig. 1, into the hopper-like chute 43 and be directed with the points of the cones into the proper trimmer tube cavity. In molding and baking cones, the cones are usually formed with what is known in the art, as "heads" being due to the excess batter squeezed out of the molds and it is these "heads" that require removal before the cone is completed as a commercially salable article. The "heads" of the cone cause the cones to rest in the chute 43, as shown in dotted lines in Fig. 2, while the chute 43 is closed. As soon after as the molds have opened to drop the cones into the chute 43, the cam 51 will come into action to move the lever 48 from the position shown in Fig. 1 to the position shown in Fig. 2, thereby withdrawing the chute sections and releasing the cones which then gravitate fully into the trimmer tubes and hang up on the "heads" as shown in full lines in Fig. 2. Should, however, the cone be molded without a "head," as not infrequently occurs, (where just the right amount of batter is fed to the molds) the cone will drop through the trimmer tube and in order to prevent it falling down chute 27 and becoming destroyed or damaged, I provide the finger device 30 to catch the cone and hold it in the chute section 27 (see dotted lines Fig. 3) until the position shown in Fig. 3 is reached. As soon as the cone has dropped into the trimmer tube from the mold, the crank 62 will have brought its roller 63 into engagement with lever 60, which lever is thereby depressed, and in depressing the lever 60 the disks 13 and 16 are rotated in a clockwise direction in Fig. 2 from the position shown in Fig. 2 to the position shown in Fig. 3. As the parts reach the position shown in Fig. 3, the chute sections 27—64 will catch and a slight further movement of the parts causes the pusher 34—35—36 to force the cone through the trimming knife and remove the excess batter or "heads." At the same time, the screw 38 will engage the plunger or spring pressed pin 31 to rock the finger 30 out of the way and permit any cones that have been held up by finger 30 to drop with those which are pushed through the trimmer tube during the final movement to effect the trimming action. As soon as the cones drop through the trimmer tubes, they will gravitate onto the horizontal portion 66 of the chute 64 and will be nested by the finger 75, as before described. As the cones are deposited onto the chute 64, they will be engaged by the finger 75 and push off the chute section 66 onto the conveyer 67 in a nested form. Each backward movement of the finger 75 causes the rod 78 to be elevated and the conveyer 67 advanced one notch until a predetermined number of cones have been formed into a stick, at which time the pawl 80 will engage the long tooth 82, (see Fig. 7) and on that stroke pull the conveyer 67 a farther distance than one notch in order to space the adjacent sticks fully apart, as at 85, in Fig. 1.

As the crank 62 continues its motion, the lever 60 will be released and the parts returned from the position shown in Fig. 3 to the position shown in Fig. 2 by the action of a spring 86 connected with the lever 60, or in any other suitable way connected to operate the chain 54 reversely. When the parts have been returned to the position shown in Fig. 1, they will be ready to receive the next set of cones and repeat the operation.

It will be noticed that chute 43 is comparatively shallow and thus the cones can gravitate into the chute and project through the same with their points projected into the proper trimmer tube cavity before the "head" of the cone has entirely left the molds, thus the molds aid in guiding the cone into the trimmer tubes, assisted by the hopper-like chute 43.

In order that the cones may not drop below the mold bottom until the molds are fully opened at the extraction station, in the machine where the molds begin to open before the extraction station is reached, I provide a cutoff plate 87 which is preferably formed with a lip 88 so as to hold back the cone from falling until the points reach the lip 88 and are shunted into the chute 43. It will be noted that my present construction of trimming mechanism is compact and positive in its action and in coöperation with the counting and nesting devices serves as a very practical way for delivering the cones from the machine in such assemblages as will make it exceedingly convenient for the boxer or attendant to put the cones into the honey-combed boxes, it being understood that the boxes employed are of the usual card-board type with "honey-comb" tubes.

If desired, a guard 89 may be provided to catch the trimmings and deflect them to one side so as not to interfere with the nesting of the cones.

What I claim is:

1. In a machine of the class described, a trimming mechanism which comprises a tubular receiving chute for the cones as they leave the molds, an oscillating trimmer tube, and a fixed pusher against which said tube is pressed.

2. A mechanism as defined in claim 1, in combination with a discharging chute composed of sections, one of which is fixed as to location, and the other is carried by the trimmer tube, the sections matching when the trimmer tube is in the trimming position.

3. A mechanism as defined in claim 1 combined with a device which holds the cones that pass through the trimmer tube at the receiving station until the trimmer tube reaches the discharge or trimming position.

4. A mechanism as defined in claim 2 combined with a device which holds the cones that pass through the trimmer tube at the receiving station until the trimmer tube reaches the discharge or trimming position.

5. In a mechanism of the class described, a sectional tubular receiving chute having a restricted outlet, a trimmer mechanism into which a cone is deposited by said chute and devices for operating the chute sections to open and close the same.

6. In a machine of the character described, a sectional receiving chute located at the extraction station, an oscillatably supported trimmer tube into which said chute delivers the cone, a fixed pusher, and mechanism for first separating the said chute sections and then swinging the trimmer tube into position to engage the pusher.

7. In a machine of the character described, a sectional receiving chute located at the extraction station, an oscillatably supported trimmer tube into which said chute delivers the cone, a fixed pusher, mechanism for first separating the said chute sections and then swinging the trimmer tube into position to engage the pusher, a detent device for holding a cone that drops through the trimmer tube at the extraction station until said trimmer tube reaches the pusher engaging position.

8. In a machine of the character described, a sectional receiving chute located at the extraction station, an oscillatably supported trimmer tube into which said chute delivers the cone, a fixed pusher, mechanism for first separating the said chute sections and then swinging the trimmer tube into position to engage the pusher, and means at the pusher engaging station for receiving the cones which are released from the trimmer tube for delivering from the machine.

9. In a machine of the character described, a sectional receiving chute located at the extraction station, an oscillatably supported trimmer tube into which said chute delivers the cone, a fixed pusher, mechanism for first separating the said chute sections and then swinging the trimmer into position to engage the pusher, a detent device for holding a cone that drops through the trimmer tube at the extraction station until said trimmer tube reaches the pusher engaging position, and means at the pusher engaging station for receiving the cones which are released from the trimmer tube for delivering from the machine.

10. A mechanism as defined in claim 8 combined with a device to engage the cones which are received from the trimmer tube and stack the same in "sticks" of predetermined length.

11. A mechanism as defined in claim 9 combined with a device to engage the cones which are received from the trimmer tube and stack the same in "sticks" of predetermined length.

12. A mechanism as defined in claim 10, combined with a traveling conveyer and mechanism coöperative with said stacking device for advancing said conveyer in harmony with the movement of said stacking device.

13. In a machine of the character described, a sectional receiving chute located at the extraction station, an oscillatably supported trimmer tube into which said chute delivers the cone, a fixed pusher, mechanism for first separating the said chute sections and then swinging the trimmer tube into position to engage the pusher, means at the pusher engaging station for receiving the cone released from the trimmer tube, a device for engaging the cones received from the trimmer tube to stack the same in sticks of predetermined length, said devices comprising a cone moving element, means coöperative with the trimming mechanism for actuating said element, a traveling conveyer and means coöperative with said cone moving device for advancing said conveyer in harmony with the movement of the same through predetermined intervals.

14. In a mechanism of the class described, an oscillatable trimmer comprising a fixed pusher, a rotatable shaft, a crank arm carried by said shaft, a trimmer tube carried by said crank arm, means for maintaining said trimmer tube with its axis parallel to itself, while said crank arm oscillates said trimmer tube from the receiving position to the position in engagement with the pusher and means for oscillating said shaft.

15. In a mechanism of the class described, a supporting structure, a shaft journaled in bearings in said structure, crank arms mounted on said shaft, a trimmer tube bar having trunnions journaled in said crank arms, a second set of crank arms located at a different place from the first set, a connection between said second set of crank arms and said trimmer tube carrying bar, and a chain connection between said shafts whereby as said shaft is moved said shafts will be oscillated, a fixed pusher into engagement with which said trimmer tube is designed to be brought during the oscillation of said shafts, and a crank and lever device for moving said chain to effect the oscillation of said shaft to bring the trimmer tube from the receiving place to the pusher engaging place.

16. In a mechanism of the class described, an oscillatable trimmer comprising a fixed pusher, a rotatable shaft, a crank arm carried by said shaft, a trimmer tube carried by said crank arm, means for maintaining said trimmer tube with its axis parallel to itself, while said crank arm oscillates said trimmer tube from the receiving position to the position in engagement with the pusher, means for oscillating said shaft combined with a receiving hopper-chute located at the extraction station to receive the cones from the molds and direct them into the trimmer tube.

17. In a mechanism of the class described, a supporting structure, a shaft journaled in bearings in said structure, crank arms mounted on said shaft, a trimmer tube bar having trunnions journaled in said crank arms, a second set of crank arms located at a different place from the first set, a connection between said second set of crank arms and said trimmer tube carrying bar, and a chain connection between said shafts whereby as said shaft is moved said shafts will be oscillated, a fixed pusher into engagement with said trimmer tube is designed to be brought during the oscillation of said tube, combined with a receiving hopper-chute located at the extraction station to receive the cones from the molds and direct them into the trimmer tube.

18. In a mechanism of the class described, an oscillatable trimmer comprising a fixed pusher, a rotatable shaft, a crank arm carried by said shaft, a trimmer tube carried by said crank arm, means for maintaining said trimmer tube with its axis parallel to itself, while said crank arm oscillates said trimmer tube from the receiving position to the position in engagement with the pusher, means for oscillating said shaft combined with a receiving hopper-chute located at the extraction station to receiving the cones from the molds and direct them into the trimmer tube, said hopper-chute comprising separable sections, and a cam actuated lever device coöperatively connected with said sections for opening and closing the same.

19. In a mechanism of the class described, a supporting structure, a shaft journaled in bearings in said structure, crank arms mounted on said shaft, a trimmer tube bar having trunnions journaled in said crank arms, a second set of crank arms located at a different place from the first set, a connection between said second set of crank arms and said trimmer tube carrying bar, a chain connection between said shafts whereby as said shaft is moved said shafts will be oscillated, a fixed pusher into engagement with said trimmer tube is designed to be brought during the oscillation of said tube, combined with a receiving hopper-chute located at the extraction station to receive the cones from the molds and direct them into the trimmer tube, and a cam actuated lever device coöperatively connected with said sections for opening and closing the same.

FREDERICK A. BRUCKMAN.